Patented Dec. 17, 1935

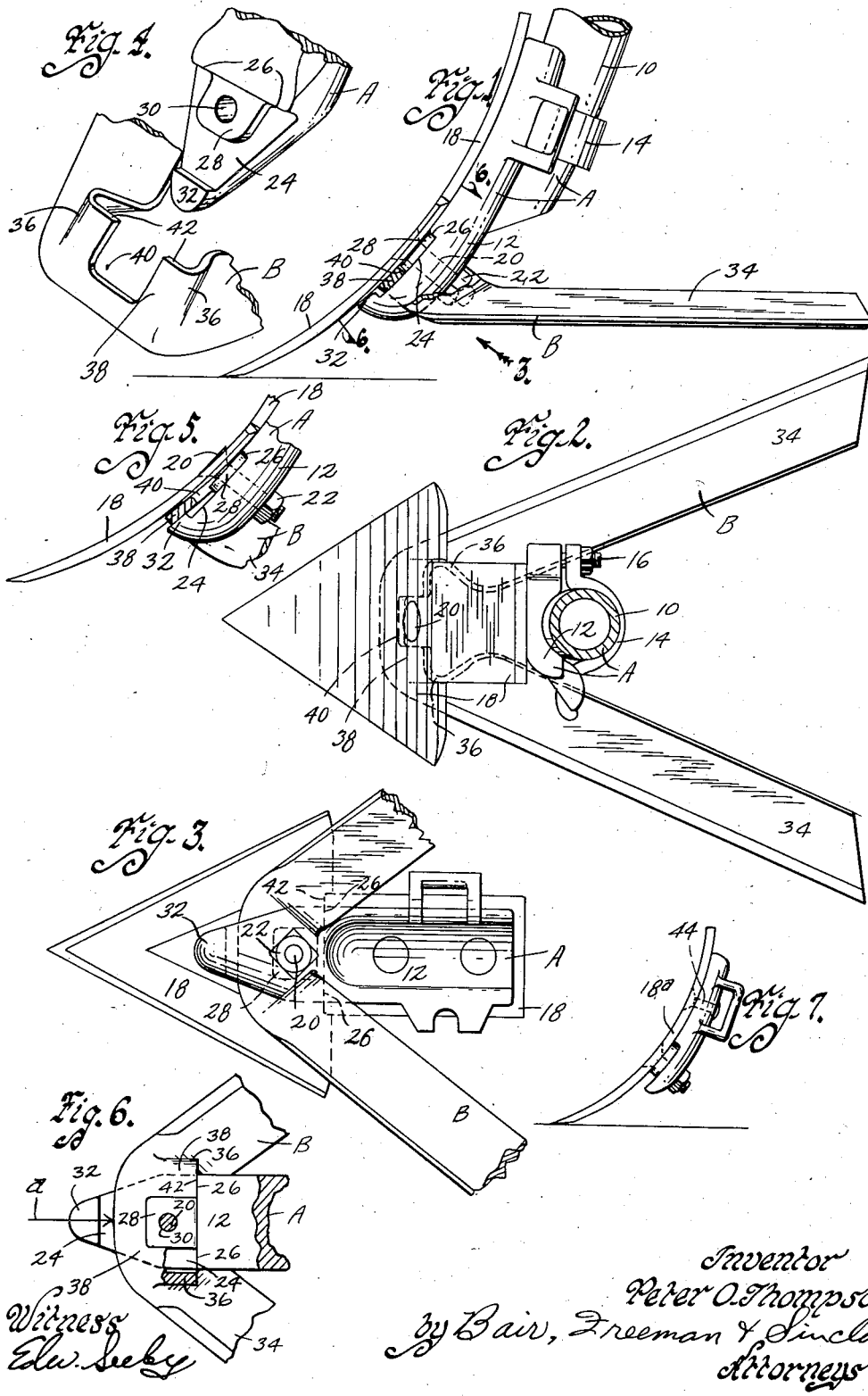

2,024,402

UNITED STATES PATENT OFFICE 2,024,402

CULTIVATOR CONSTRUCTION

Peter O. Thompson, Perry, Iowa, assignor to Osmundson Spade Manufacturing Company, Perry, Iowa Application February 4, 1935, Serial No. 4,745

7 Claims. (Cl. 97—205)

An object of my invention is to provide a cultivator construction of the type having an auxiliary blade attached to the cultivator shovel, the method of attachment being comparatively simple and inexpensive to construct.

A further object is to provide means for attaching an auxiliary blade of the kind sometimes called a "sweep blade" to a cultivator shovel shank in such manner that it is readily removable, yet securely clamped in position with a partial turn of the nut on the clamping bolt.

Still another object is to provide a cultivator shovel shank having a rabbet formed therein, whereby an auxiliary blade can be slipped into the rabbet between the shank and the cultivator shovel and then clamped in this position by tightening the nut on the bolt, which ordinarily holds the shovel in position on the shank.

Still a further object is to provide the auxiliary blade with a slot or notch to straddle the bolt or a boss on the shank surrounding the bolt.

With these and other objects in view, my invention consists in the construction, arrangement and combination of the various parts of my cultivator construction, whereby the objects contemplated are attained, as hereinafter more fully set forth, pointed out in my claims, and illustrated in the accompanying drawing, in which:

Figure 1 is a side elevation of a cultivator construction embodying my invention, showing part of the auxiliary blade cut away, and other parts shown in section.

Figure 2 is a plan view of Figure 1.

Figure 3 is a bottom plan view of the cultivator shovel shank and auxiliary blade, the ends of the blade being cut away to conserve space on the drawing.

Figure 4 is a perspective view of the coacting parts of the shank.

Figure 5 is a side elevation showing the auxiliary blade being slipped into position.

Figure 6 is a sectional view on the line 6—6 of Figure 1; and

Figure 7 is a side elevation of a slightly modified form of construction.

In the accompanying drawing, I have used the reference character A to indicate generally a cultivator shank. The shank A, as illustrated, comprises an upper shank 10 and a lower shank member 12, the lower member being connected to the upper one by a curved clamp bar 14 and a clamp bolt 16.

A cultivator shovel 18 is adapted to be clamped across the front face of the shank 12 by a countersunk clamp bolt 20, having a nut 22 threaded thereon. The shank 12 is rabbeted to form a face 24 and a shoulder 26. A boss 28 is formed on the face 24 of the rabbet and surrounds an opening 30 of the shank 12 through which the clamp bolt 20 extends. The boss 28 is slightly lower in height than the shoulder 26, so that its upper face does not contact with the cultivator shovel 18.

Beyond the lower end of the rabbet face 24, I may provide a lug 32 or may omit this lug, as shown in Figure 7, if desired.

An auxiliary blade B is provided having "sweep blade" portions 34 and kinks indicated at 36, which form a central attaching portion 38 as best shown in Figure 4. The attaching portion 38 is provided with a slot 40 to fit around or straddle the boss 28. The rear ends of the attaching portion 38 indicated at 42 are adapted to fit against the shoulder 26 of the rabbet in the shank 12 as will hereinafter appear.

The auxiliary blade B is mounted in position in Figures 1, 2, 3 and 6. As best shown in Figure 6, the edges 42 of the auxiliary blade are in contact with the shoulder portions 26 of the shank 12. This is in the direction of draft when the cultivator is in use, as the ground through which the blade is passing, tends to press the blade in the direction of the arrow "a" thus insuring engagement of the edges 42 with the shoulder 26 and consequently proper alignment of the auxiliary blade relative to the shank.

When it is desirable to remove the blade B, the nut 22 on the bolt 20 is loosened sufficiently so that the shovel can be swung away from the shank as shown in Figure 5, and then the portion 38 of the blade B slid out between the lug 32 and the cultivator shovel.

The shovel may then be clamped in position by tightening the nut 22 or a different auxiliary blade can be inserted, if desired.

This construction permits quick and easy removal, replacing or changing of the auxiliary blades without removing any bolts, and this is one of the most important features of the invention.

The lug 32 is normally out of contact with the cultivator shovel as it is desirable to clamp the portion 38 of the blade B between the shank and shovel, and for this same reason, the boss 28 is made thinner than the thickness of the portion 38 of the blade.

Any undue strains tending to bend the point of the shovel backward, however, will be counteracted by the lug 32, which would then serve as a reinforcement for the point of the shovel.

As shown in Figure 7, the invention can be applied to the type of shovel having a second attaching means, such as a rivet 44. The shovel can not be bent away in this type of construction, and therefore the lug 32 is eliminated, leaving a true rabbet into which the auxiliary blade can be inserted, whereupon the clamping bolt can be tightened for retaining the blade in position.

Some changes may be made in the arrangement and construction of the various parts of my cultivator construction without departing from the real spirit and purpose of my invention, and it is my intention to cover by my claims, any modified forms of structure or use of mechanical equivalents, which may be reasonably included within their scope.

I claim as my invention:

1. In a cultivator construction, a shank, a shovel against one face thereof, a clamp bolt through said shovel and shank, a rabbet in said shank providing a space between said shovel and shank, and an auxiliary blade positioned in said rabbet and clamped between said shovel and shank when said clamp bolt is tight, said auxiliary blade having a rearwardly opening slot to straddle said clamp bolt.

2. In a cultivator construction, a shank, a shovel against one face thereof, a clamp bolt through said shovel and shank, a rabbet in said shank providing a space between said shovel and shank, an auxiliary blade positioned in said rabbet and clamped between said shovel and shank when said clamp bolt is tight, and a boss formed on said shank within said rabbet and surrounding said clamp bolt, said auxiliary blade being slotted to straddle said boss.

3. In a cultivator construction, a shank, a shovel against one face thereof, a clamp bolt through said shovel and shank, a rabbet in said shank providing a space between said shovel and shank, an auxiliary blade positioned in said rabbet and clamped between said shovel and shank when said clamp bolt is tight, and a boss formed on said shank within said rabbet and surrounding said clamp bolt, said auxiliary blade having an upwardly opening slot to straddle said boss, the portions of said auxiliary blade on each side of said boss engaging the shoulder of said rabbet.

4. In a cultivator construction, a shank, a shovel against one face thereof, a clamp bolt through said shovel and shank, a rabbet in said shank providing a space between said shovel and shank, and an auxiliary blade positioned in said rabbet and clamped between said shovel and shank when said clamp bolt is tight, said shank having a portion extending forwardly of said auxiliary blade to position slightly spaced from said cultivator shovel.

5. In a cultivator construction, a shank, a shovel against one face thereof, a clamp bolt through said shovel and shank, a rabbet in said shank providing a space between said shovel and shank, an auxiliary blade positioned in said rabbet and clamped between said shovel and shank when said clamp bolt is tight, and an other than circular boss formed on said shank within said rabbet and surrounding said clamp bolt, said auxiliary blade having an opening to receive and fit a portion of the periphery of said boss to prevent rotation of said blade relative to said boss.

6. In a cultivator construction, a shank, a shovel against one face thereof, a clamp bolt through said shovel and shank, a rabbet in said shank providing a space between said shovel and shank, an auxiliary blade positioned in said rabbet and clamped between said shovel and shank when said clamp bolt is tight, and a boss formed on said shank within said rabbet, said auxiliary blade being slotted to straddle said boss.

7. In a cultivator construction, a shank, a shovel against one face thereof, a clamp bolt through said shovel and shank, a rabbet in said shank providing a space between said shovel and shank, an auxiliary blade positioned in said rabbet and clamped between said shovel and shank when said clamp bolt is tight, and an other than circular boss formed on said shank within said rabbet, said auxiliary blade being slotted to straddle said boss and the slot thereof being shaped to fit a portion of the periphery thereof to prevent rotation of said blade relative to said boss.

PETER O. THOMPSON.